United States Patent
Malwankar et al.

(10) Patent No.: US 10,467,163 B1
(45) Date of Patent: Nov. 5, 2019

(54) SOLID STATE DRIVE MULTIPLEXER

(71) Applicant: Pavilion Data Systems, Inc., San Jose, CA (US)

(72) Inventors: Kiron Balkrishna Malwankar, Saratoga, CA (US); Karagada Ramarao Kishore, Saratoga, CA (US); Daehwan D. Kim, Sunnyvale, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 189 days.

(21) Appl. No.: 15/335,300

(22) Filed: Oct. 26, 2016

Related U.S. Application Data

(60) Provisional application No. 62/247,119, filed on Oct. 27, 2015.

(51) Int. Cl.
| | | |
|---|---|---|
| G06F 13/40 | (2006.01) | |
| G06F 13/28 | (2006.01) | |
| G06F 13/42 | (2006.01) | |
| G06F 3/06 | (2006.01) | |
| H04L 12/931 | (2013.01) | |

(52) U.S. Cl.
CPC .......... *G06F 13/287* (2013.01); *G06F 3/0619* (2013.01); *G06F 3/0655* (2013.01); *G06F 3/0688* (2013.01); *G06F 13/4022* (2013.01); *G06F 13/4221* (2013.01); *G06F 13/4282* (2013.01); *H04L 49/356* (2013.01); *H04L 49/357* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 7,652,922 B2 * | 1/2010 | Kim | ..................... | G06F 13/4243 365/185.11 |
| 9,645,902 B2 * | 5/2017 | Breakstone | ......... | G06F 11/2012 |
| 9,965,011 B2 * | 5/2018 | Frick | ..................... | G06F 1/3221 |

(Continued)

FOREIGN PATENT DOCUMENTS

| | | | | | |
|---|---|---|---|---|---|
| CN | 107145310 A | * | 9/2017 | | |
| CN | 107710141 A | * | 2/2018 | ............. | G06F 1/181 |
| KR | 20170040897 A | * | 4/2017 | ............. | G06F 1/181 |

OTHER PUBLICATIONS

'PEX8725—Product Brief' by PLX Technology, Aug. 22, 2011. (Year: 2011).*

(Continued)

*Primary Examiner* — Steven G Snyder
(74) *Attorney, Agent, or Firm* — Lowenstein Sandler LLP

(57) ABSTRACT

An apparatus includes a first serial port having a first number of lanes usable to form a first multi-lane link to a solid state drive (SSD) and a second serial port having a second number of lanes that is at least twice the first number of lanes. A first subset of the second number of lanes constitutes a first logical serial port and is usable to form a second multi-lane link to a first transport fabric and a second subset of the second number of lanes constitutes a second logical serial port and is usable to form a third multi-lane link to a second transport fabric. The apparatus further includes a controller and a multiplexer to connect the first serial port to one of the first logical serial port or the second logical serial port.

20 Claims, 11 Drawing Sheets

(56) References Cited

U.S. PATENT DOCUMENTS

| | | | |
|---|---|---|---|
| 10,175,902 B2* | 1/2019 | Springberg | G06F 3/0625 |
| 2011/0196986 A1* | 8/2011 | Shanbhag | H04L 49/356 |
| | | | 709/244 |
| 2011/0225352 A1* | 9/2011 | Duran | G06F 3/0616 |
| | | | 711/103 |
| 2012/0166699 A1 | 6/2012 | Kumar et al. | |
| 2013/0191590 A1* | 7/2013 | Malwankar | G06F 3/0611 |
| | | | 711/114 |
| 2013/0250508 A1* | 9/2013 | Martin-Otto | H05K 7/1491 |
| | | | 361/679.33 |
| 2014/0049897 A1* | 2/2014 | Hoss | G06F 1/187 |
| | | | 361/679.31 |
| 2014/0348173 A1* | 11/2014 | Majumdar | H04L 45/26 |
| | | | 370/392 |
| 2015/0278139 A1* | 10/2015 | Pamley | G06F 13/4022 |
| | | | 710/313 |
| 2015/0355686 A1* | 12/2015 | Heyd | G06F 1/187 |
| | | | 361/679.31 |
| 2015/0363109 A1* | 12/2015 | Frick | G06F 1/3221 |
| | | | 711/112 |
| 2015/0370665 A1* | 12/2015 | Cannata | G06F 11/2012 |
| | | | 714/4.11 |
| 2015/0373115 A1* | 12/2015 | Breakstone | G06F 11/2012 |
| | | | 709/217 |
| 2016/0259551 A1* | 9/2016 | Ping | G06F 3/061 |
| 2016/0259754 A1* | 9/2016 | Ping | G06F 3/0688 |
| 2017/0046295 A1* | 2/2017 | Schwemmer | G06F 13/4022 |
| 2017/0228336 A1* | 8/2017 | Breakstone | G06F 13/4022 |
| 2018/0032462 A1* | 2/2018 | Olarig | G06F 13/4022 |
| 2018/0048592 A1* | 2/2018 | Worley | H04L 49/30 |
| 2018/0210517 A1* | 7/2018 | Yun | G06F 1/181 |

OTHER PUBLICATIONS

IBM Technical Disclosure Bulletin NN9210391 'Method for Card Hot Plug Detection and Control' by IBM, Oct. 1, 1992. (Year: 1992).*

'Optimizing PCIe SSD performance' by Shawn Kung, Marvell Technology and Larry Chisvin, PLX Technology, Aug. 20, 2012. (Year: 2012).*

* cited by examiner

US 10,467,163 B1

SOLID STATE DRIVE MULTIPLEXER

RELATED APPLICATIONS

The present application claims the benefit of U.S. Provisional Patent Application No. 62/247,119 filed Oct. 27, 2015, which is incorporated by reference herein.

FIELD OF TECHNOLOGY

This disclosure relates generally to the field of data storage and in particular to providing redundant access ports to solid state drives (SSDs).

BACKGROUND

Networked storage arrays may provide an enterprise level solution for secure and reliable data storage. With the introduction of solid state storage devices (e.g., solid state drives (SSDs) such as Flash drives), the speed of such networked storage arrays has improved dramatically. SSDs have a single physical connection to a server, which may be a single peripheral component interconnect express (PCIe) port with multiple lanes, a single serial attached small computer system interface (SAS) port, a single serial AT attachment (SATA) port, etc. Most SSDs are only capable of a single connection to a single transport fabric. Some advanced SSDs are capable of a multi-port configuration in which the single PCIe port is divided into two logical ports each having reduced lanes and being connected to a separate transport fabric. However, for the multi-port configuration each logical port has a reduced performance because the bandwidth of the single physical port is divided between the two logical ports.

BRIEF DESCRIPTION OF THE DRAWINGS

The embodiments described herein will be understood more fully from the detailed description given below and from the accompanying drawings.

FIG. 7 is a flow diagram of one embodiment for a method of selecting a transport fabric to connect a solid state drive to.

DETAILED DESCRIPTION

Described herein are embodiments of a solid state drive (SSD) multiplexer that can selectively connect an SSD to multiple different transport fabrics (also referred to as backplane fabrics). Each connection to a transport fabric may be a full bandwidth connection that utilizes all lanes of a port on the SSD. Thus, the SSD multiplexer may be plugged into an SSD to provide full bandwidth redundant paths to the SSD. The SSD multiplexer enables an SSD to have both high availability and full bandwidth. Thus, the SSD may maintain a full bandwidth connection to controllers and/or hosts at all times, even in the event of a fabric failure.

In one embodiment, the SSD multiplexer includes a first port to connect to an SSD and a second port to connect to a backplane (and to multiple backplane fabrics of the backplane). The first port may be a serial port having a first number of lanes usable to form a first multi-lane link to the SSD. The second port may be a serial port having a second number of lanes that is at least twice the first number of lanes. A first subset of the second number of lanes may constitute a first logical serial port and be usable to form a second multi-lane link to a first transport fabric. A second subset of the second number of lanes may constitute a second logical port and be usable to form a second multi-lane link to a second transport fabric. The SSD multiplexer additionally includes a multiplexer and a controller. The controller determines whether to connect the first serial port to the first logical serial port or the second logical serial port, and then causes the multiplexer to connect the first serial port to one of the first logical serial port or the second logical serial port.

Figure 1:
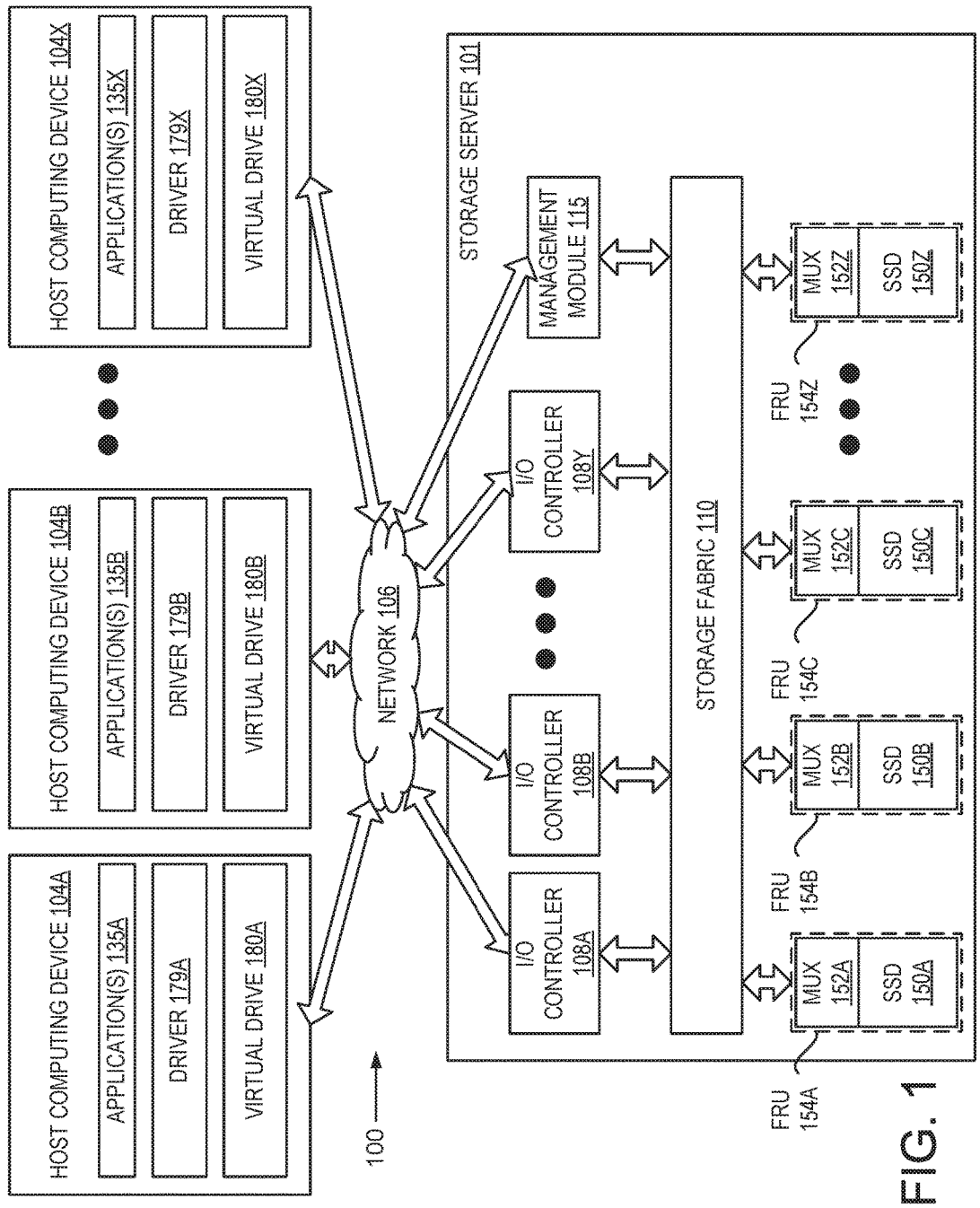
FIG. 1 is a block diagram example of a data center network architecture, in which embodiments described herein may operate.

FIG. 1 is a block diagram example of a data center network architecture 100, in which embodiments described herein may operate. The data center network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-X). Storage server 101 may be configured as part of a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Storage server 101 includes a backplane (not shown) to which other components of the storage server 101 may connect. A backplane is a board to which main circuit boards of a computing device may be connected and that provides connections between them. A backplane consists of a group of electrical connectors in parallel with each other, so that each pin of each connector may be linked to the same relative pin of all the other connectors, forming a computer bus. The backplane may be used to connect several printed circuit boards together to make up a complete computer system (e.g., a complete storage server).

Storage server 101 includes multiple input/output (I/O) controllers 108A, 108B through 108N connected to multiple solid state drives (SSDs) 150A, 150B, 150C through 150Z via a switch 110 (or multiple switches). The SSDs 150A-Z may be SAS/SATA drives, PCIe drives, non-volatile memory express (NVMe) drives, small computer system interface (SCSI) over PCIe (SOP) drives, or solid state drives that communicate using different protocols. NVMe drives are PCIe-based solid state storage devices that uses the NVMe protocol. NVMe is a scalable host controller interface for PCIe-based solid state drives, which is based on a paired submission and completion queue mechanism. For NVMe, commands are placed by hosts into a submission queue. Completions are placed into an associated completion queue by the host controller. The number of SSDs included in storage server 101 may be less than 10 to more than 100. The solid state drives may have the same or different storage capacities.

Each I/O controller 108A-Y is a device configured to connect one or more host computing devices 104A-X to one or more SSDs 150A-Z. Each I/O controller 108A-Y includes one or more network interface controllers (NICs) such as Ethernet NICs and/or other protocol adapters (e.g., such as FC, SAS/SATA, or Infiniband (IB) adapters) that connect that I/O controller to network 106. Each I/O controller 108A-Y additionally includes a port that connects to transport fabric 110 via an internal bus. In one embodiment, I/O controllers 108A-Y include peripheral component interconnect express (PCIe) ports that connect to transport fabric 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the transport fabric 110. I/O controllers 108A-Y may additionally include a volatile and/or non-volatile memory to store firmware and/or software for performing operations such as routing read and write requests to the correct SSDs 150A-Z. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and handles input/output (I/O) commands for those host computing devices. Applications 135A-X running on a host computing device 104A-X may attempt to read data from and/or write data to a virtual drive 180A-X that the host computing device 104A-X has access to. Responsive to such a read or write request, a driver 179A-X running on the host computing device 104A-X encapsulates a read or write command into a message (e.g., into an Ethernet packet) and sends the message to the I/O controller 108A-Y that is assigned to that host computing device 104A-X.

When the I/O controller 108A-Y receives the read or write command from the host computing device 104A-X, the I/O controller 108A-Y extracts the read or write command from the message and determines what logical addresses of the virtual drive 180A-X should be used to write the data to or read the data from. The I/O controller 108A-Y may additionally translate the logical addresses of the virtual drive to physical addresses of the SSDs 150A-Z. For example, if a read command was received, the I/O controller 108A-Y may determine which SSDs 150A-Z store the information to be read as well as which physical addresses on those SSDs the data should be read from. In another example, if a write command was received, the I/O controller 108A-Y may determine which SSDs 150A-Z to write portions of received data to as well as which physical addresses of those SSDs 150A-Z to write the data to. The I/O controller 108A-Y may then generate one or more commands directed to the determined SSDs 150A-Z to write data to those SSDs or read data from those SSDs 150A-Z.

I/O controllers 108A-Y may additionally include array configuration information for the SSDs 150A-Z that may be used to reconstruct a portion of one or more virtual drives 180A-X so that data referenced by the virtual drives 180A-X can be retrieved if one or more of the SSDs 150A-Z becomes unavailable.

The backplane of the storage server 101 includes a transport fabric 110. In one embodiment, the backplane of storage server 101 includes multiple different transport fabrics (backplane fabrics). Each transport fabric 110 includes hardware (e.g., switches, etc.) that connects I/O controllers 108A-Y to SSDs 150A-Z. Each transport fabric 110 may include a fabric board (e.g., a printed circuit board (PCB) that includes multiple hardware components. Alternately, multiple transport fabrics may be part of a single backplane printed circuit board (PCB). Each transport fabric 110 enables any I/O controller 108A-Y to connect to any SSD 150A-Z. Each transport fabric 110 may be independent of other transport fabrics, using its own hardware, ports, connections, etc. that are distinct from those used by the other transport fabrics. Accordingly, if any component in a transport fabric 110 fails and causes that transport fabric to fail, the I/O controllers 108A-Y may continue to maintain connections to the SSDs 150A-Z via an alternative transport fabric.

Transport fabric 110 may include one or more switches, each of which may be a multi-port bridge that connect I/O controllers 108A-Y to SSDs 150A-Z. Transport fabric 110 manages the flow of data within storage server 101 by connecting specific I/O controllers 108A-Y to specific SSDs 150A-Z on a message by message basis, allowing the transport fabric 110 to regulate the flow of traffic. Each I/O controller 108A-Y and each SSD 150A-Z connected to transport fabric 110 can be identified using a unique address (e.g., a unique port address) of the I/O controller or SSD. Transport fabric 110 may include a PCIe switch, an Ethernet switch, a SAS or SATA expander, a USB switch, or other type of switch. Though a single transport fabric 110 is shown, storage server 101 may include multiple transport fabrics (each of which may include one or more switches).

Each solid state drive (SSD) 150A-Z (also referred to as a solid state storage device) is a non-volatile storage device that uses integrated circuits to persistently store data. SSDs 150A-Z have numerous advantages over traditional disk drives. As compared to disk drives. SSDs are more resilient, consume less power, and have lower latency (access times). In one embodiment. SSDs 150A-Z are NAND-based Flash memory devices or NOR-based Flash memory devices. Flash memory devices are non-volatile and can be electronically erased and reprogrammed. Alternatively, one or more SSDs 150A-Z may be volatile memory-based solid state drives (e.g., dynamic random access memory (DRAM)-based SSDs) that have a battery backup. In one embodiment, the SSDs 150A-Z are NVMe drives.

SSDs 150A-Z typically include a single physical port (e.g., a PCIe port) to connect to the backplane. This single port may be a peripheral component interconnect express (PCIe) port, a SCSI port, a SAS port, a SATA port, a Fibre Channel port, or a USB port, for example. The port on the SSDs 150A-Z permits either a single full bandwidth connection to a single transport fabric or storage server or partial bandwidth connections to multiple transport fabrics or storage servers. However, the SSDs 150A-Z are not natively capable of full bandwidth connections to multiple different transport fabrics or multiple different storage servers.

Accordingly, in embodiments each SSD 150A-150N is connected to (e.g., plugged into) a different SSD multiplexer (MUX) 152A, 152B. 152C through 152N. Each SSD multiplexer 152A-Z includes a pair of ports and a multiplexer. A first port connects to the SSD 150A-Z. and a second port connects to the backplane, and through the backplane to transport fabric 110 (or to multiple different switches of multiple different transport fabrics). The SSD multiplexers 152A-Z enable the SSDs 150A-Z to have full bandwidth connections to multiple different transport fabrics, thus enabling high availability at full bandwidth.

Each pair of an SSD 150A-Z and an attached MUX 152A-Z forms a single field replaceable unit (FRU) 154A. 154B, 154C through 154N. Each FRU 154A-Z can be hot plugged and hot unplugged from the storage server 101 as a single unit. To hot plug an SSD means to plug the SSD into the storage server 101 while the storage server is running. To hot unplug an SSD means to unplug (remove) the SSD from the storage server 101 while the storage server 101 is running. In one embodiment, the SSD multiplexer is integrated into the SSD (e.g., is a component of the SSD).

Storage server 101 additionally includes a management module 115. Management module 115 may be a device configured to perform particular operations with regards to management of the array of SSDs 150A-Z, management of I/O controllers and so on. Management module 115 may include a processing device, a port for connecting to transport fabric 110 and a network interface card (NIC) for connecting to network 106. Management module 115 may additionally include a volatile and/or non-volatile memory to store firmware and/or software for performing operations described herein. In one embodiment, management module 115 is a SoC.

The management module 115 determines how to configure the array of SSDs 150A-Z and further determines configurations for one or more virtual drives 180A-X. For example, management module 115 may determine which virtual drives map to which physical SSDs and which portions of those SSDs the virtual drives map to. Once these configurations are determined, management module 115 may send these configurations to the I/O controllers 108A-Y for implementation. Management module 115 may additionally participate in discovery operations and may be responsible for pairing I/O controllers 108A-Y with host computing devices 104A-X.

Host computing devices 104A-X may each include a physical machine and/or a virtual machine hosted by a physical machine. The physical machine may be a rackmount server, a desktop computer, or other computing device. In one embodiment, one or more host computing device 104A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's@ Elastic Compute Cloud (EC2®).

Each host computing device 104A-X may host one or more applications 135A, 135B through 135X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., solid state drives (SSDs) 150A, 150B, 150C, through 150Z of storage server 101). Additionally, a virtual drive 180A-X may map a logical storage address space to physical storage address spaces of storage devices on multiple different storage servers.

Figure 2:
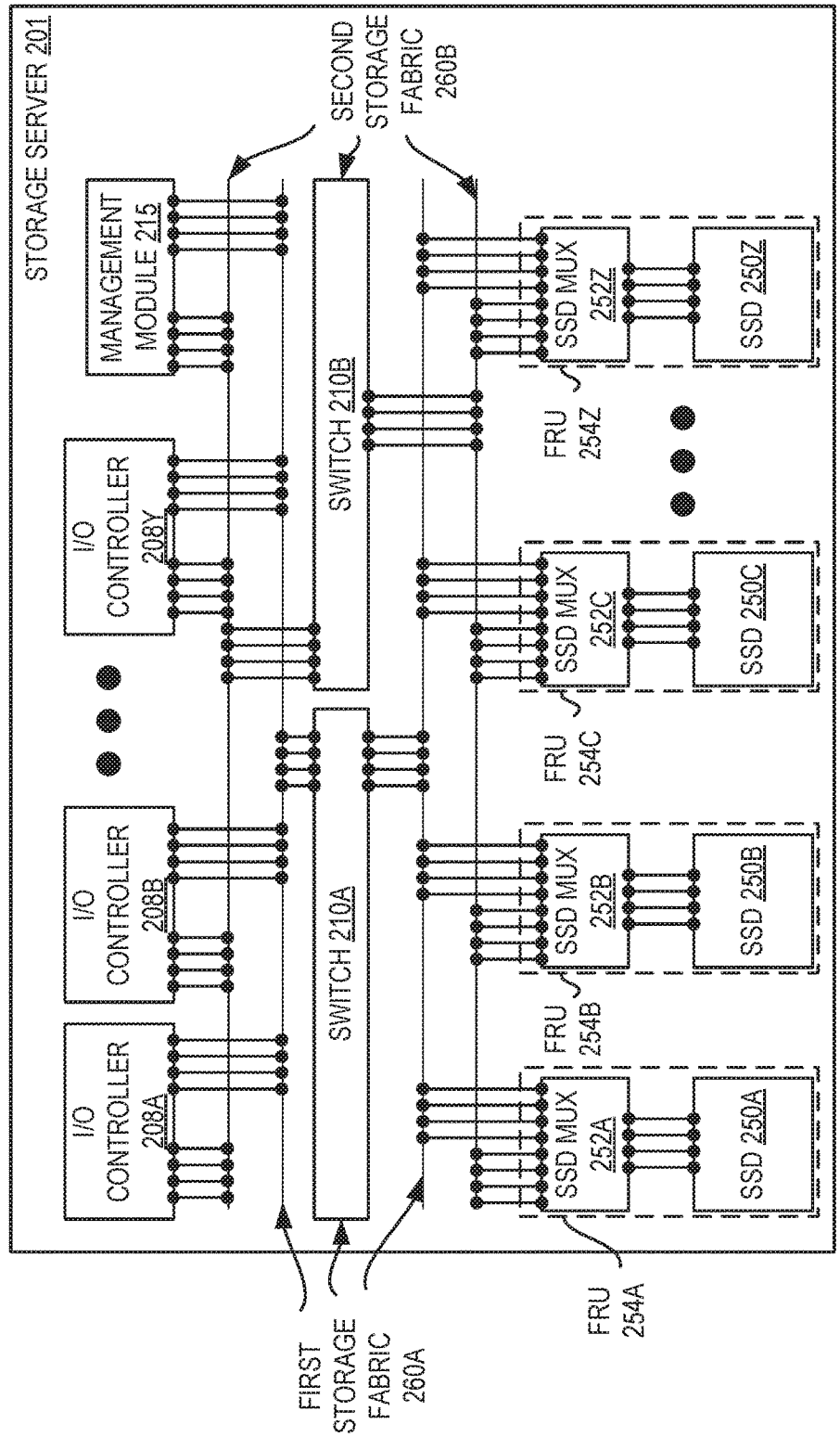
FIG. 2 is a block diagram of one embodiment of a storage server.

FIG. 2 is a block diagram of one embodiment of a storage server 201. In one embodiment, storage server 201 corresponds to storage server 101 of FIG. 1. Storage server 201 includes multiple I/O controllers 208A, 208B through 208N and a management module 215 that are each connected to multiple different transport fabrics. In one embodiment, storage server 201 includes a first transport fabric 260A and a second transport fabric 260B. In alternative embodiments, storage server may include more than two transport fabrics. Each transport fabric 260A-B may include its own connectors, ports, hardware (e.g., switches), and so on that are separate and distinct from those of other transport fabrics. For example, first transport fabric 260A includes a first switch 210A (which may include multiple switches) and second transport fabric 260B includes a second switch 210B (which may include multiple switches).

Storage server 201 additionally includes multiple field replaceable units (FRUs) 254A, 254B, 254C, through 254Z, each of which may be plugged into a port in a backplane of the storage server 201. Each FRU 254A-Z may include an SSD 250A, 250B, 250C, through 250Z coupled to an SSD multiplexer 252A, 252B, 252C, through 252Z. Each FRU 254A-Z may additionally include a drive carrier (not shown) to which the SSD multiplexer 252A-Z and SSD 250A-Z may be mounted. Each FRU 254A-Z may function as a single unit that can be plugged into and unplugged from the storage server 201.

Each SSD 250A-Z includes a single physical port. In one embodiment, the port on the SSD 250A-Z is a SSD form factor (SFF) port with a male connector (e.g., with multiple pins). In one embodiment, the port on the SSD 150A-Z is an SFF-8639 PCIe port (also referred to as a U.2 port). PCIe is a high-speed serial computer expansion bus used to couple peripheral devices such as SSDs to a computing device. PCIe uses a point-to-point topology, with separate serial links connecting every device to a root complex (e.g., via a transport fabric). The PCIe link between two devices (e.g., between an SSD and an I/O controller) can consist of between one and thirty two lanes. Each lane is composed of two differential signaling pairs in which one pair is for sending data and the other pair is for receiving data. Accordingly, each lane includes four wires or signal traces that are used for a full-duplex byte stream. In one embodiment, each lane has an input/output capacity of 8 Gigabits per second. Alternatively, each lane may have an input/output capacity of up to 32 Gigabits per second. In a multi-lane link, packet data is striped across lanes, and peak data throughput scales with the number of lanes used. In one embodiment, the single physical port in each SSD 250A-Z is a 4 lane PCIe port (referred to as an ×4 PCIe port). Alternatively, the physical port may be a 2 lane (×2) port, an 8 lane (×8) port, a 16 lane (×16) port, and so on.

Each SSD multiplexer 252A-Z includes two ports. In one embodiment, a first port of the SSD multiplexer 252A-Z is a same type of port as the port in the SSD 250A-Z. For example, if the SSD 250A-Z includes an ×4 PCIe port with a male connector, then each SSD multiplexer 252A-Z may include an ×4 PCIe port with a female connector that the port in the SSD 250A-Z plugs into (e.g., a U.2 port). A second port of the SSD multiplexer 252A-Z may have at least twice the number of lanes of the first port. In one embodiment, the second port has a number of lanes that is a multiple of the first port. For example, if the first port is an ×4 PCIe port, then the second port may be an ×8, ×12 (e.g., an aggregate of three ×4 ports), ×16, etc. PCIe port. In the illustrated embodiment, the first port is an ×4 port and the second port is an ×8 port. In one embodiment, the second port is a mini PCIe port. In one embodiment, the second port is a PCIe port (or mini PCIe port) having male connectors. Thus, the second port may plug into a PCIe slot on the backplane of storage server 201.

In an alternative embodiment, multiple separate physical ports may be used instead of a single second port. Each of the physical ports may have a number of lanes equal to the number of lanes in the SSD 250A-Z. For example, the SSD multiplexer 252A-C may include a first physical port that couples to the SSD 250A-Z, a second physical port that couples to the first transport fabric 260A, and a third physical port that couples to the second transport fabric 260B. In one embodiment, the second and third ports are each U.2 ports or SSD form factor (SFF) ports. Alternatively, the second and third ports may each be standard PCIe male connectors used by PCIe cards.

In one embodiment, a first portion of the second port of the SSD multiplexers 252A-Z may couple to first transport fabric 260A and a second portion of the second port may couple to second transport fabric 260B. Similarly, I/O controllers 208A-Y and management module 215 are coupled to both the first transport fabric 260A and second transport fabric 260B. In one embodiment, a first subset of the lanes in the second port constitutes a first logical serial port and is usable to form a multi-lane link to first transport fabric 260A and a second subset of the lanes in the second port constitutes a second logical serial port and is usable to form a multi-lane link to second transport fabric 260B. The first logical serial port and second logical serial port may each have the same number of lanes as the physical port of the SSD 250A-Z. Accordingly, each logical serial port may provide full bandwidth to the SSD 250A-Z. Though two transport fabrics 260A-B are shown, storage server 201 may include more than two transport fabrics, and the SSD multiplexers 252A-Z may have full bandwidth connections to each of the transport fabrics.

Management module 215 determines which transport fabric 260A, 260B to make active. Management module 215 may then send a message to each SSD multiplexer 252A-Z indicating which of the transport fabrics is active. Each SSD multiplexer 252A-Z then couples the logical serial port connected to the active transport fabric to the SSD 250A-Z. At any time the management module 215 may determine to make a different transport fabric active, and may send a new message notifying the SSD multiplexers 252A-Z to switch to that transport fabric.

Figure 3:
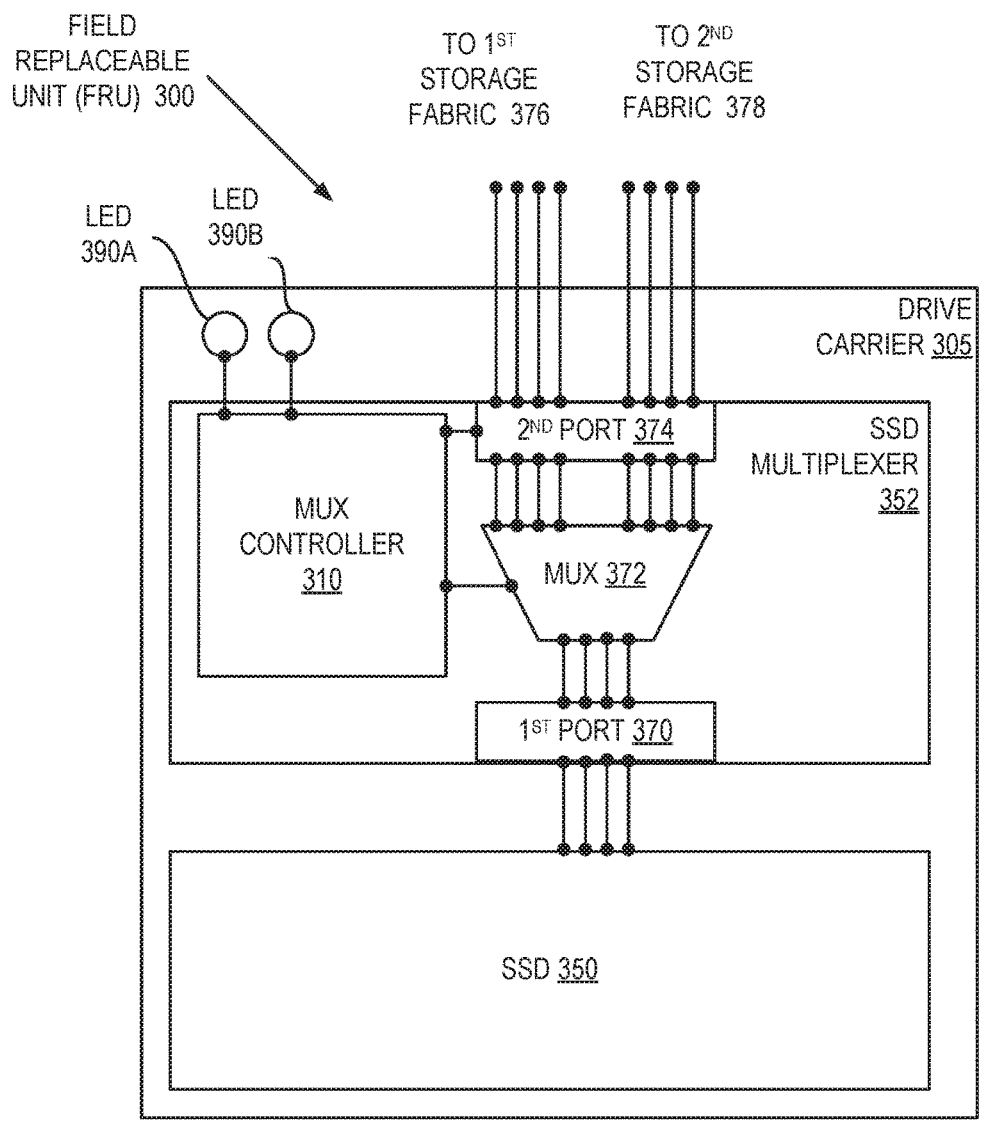
FIG. 3 is a block diagram of one embodiment of a field replaceable unit.

FIG. 3 is a block diagram of one embodiment of a field replaceable unit (FRU) 300. The FRU 300 may correspond to any of the FRUs 154A-Z of FIG. 1 and/or FRUs 254A-Z of FIG. 2. FRU 300 includes an SSD 350 coupled to (e.g., plugged into) an SSD multiplexer 352. The FRU 300 additionally includes a drive carrier 305 that the SSD 350 and SSD multiplexer 352 are mounted to. In one embodiment, SSD 350 and SSD multiplexer 352 are coupled to the drive carrier via one or more screws. The FRU 300 may have an overall length that is slightly longer than the length of a standard SSD, but may have a height and width that are approximately the same as the height and width of the SSD. The entire FRU 300 may be plugged into a chassis in the same manner that an SSD is typically plugged into a chassis of a storage server. The drive carrier 305 may include a release latch that secures the FRU 300 to the chassis of a storage server, and that can be engaged to facilitate removal of the FRU 300 from the chassis.

The SSD multiplexer 352 may be a printed circuit board (PCB) having multiple chips thereon (e.g., a multiplexer 372 chip, a multiplexer controller 310 chip (which may be a 1-wire chip), and so on). In one embodiment, the SSD multiplexer 352 is a PCIe card that can be plugged into a standard PCIe slot (e.g., an ×8 PCIe slot, an ×16 PCIe slot, etc.) in the backplane of a storage server or other computing device. As shown, the SSD multiplexer 352 includes a first port 370 that couples the SSD multiplexer 352 to SSD 350. The SSD multiplexer 352 additionally includes a second port 374 that couples the SSD multiplexer 352 to a first transport fabric 376 and to a second transport fabric 378. Alternatively, the SSD multiplexer 352 may include a second physical port that connects to first transport fabric 376 and a third physical port that connects to second transport fabric 378. The first port 370 may be a PCIe port with a first number of lanes (e.g., an ×4 PCIe port) and second port 374 may be a PCIe port having at least twice the number of lanes of the first port 370 (e.g., may be an ×8 PCIe port). SSD multiplexer 352 additionally includes a multiplexer 372 interposed between the first port 370 and the second port 374. The multiplexer 372 may connect the first port 370 either to a first portion of the second port 374 that is arranged as a first logical port or a second portion of the second port 374 that is arranged as a second logical port. Thus, the SSD multiplexer 352 may provide multiple non-intervening paths via redundant access ports to the SSD 350, each of which provide the best performance possible for the SSD 350.

SSD multiplexer 352 includes a multiplexer controller 310 that controls the multiplexer 372. Multiplexer controller 310 may include a processing device such as a system on a chip (SoC), field programmable gate array (FPGA), an application specific integrated circuit (ASIC), a digital signal processor (DSP), a network processor, a complex instruction set computing (CISC) microprocessor, a reduced instruction set computing (RISC) microprocessor, a very long instruction word (VLIW) microprocessor, or the like. The processing device may be configured to execute processing logic for performing operations discussed herein. The multiplexer controller 310 may additionally include a non-volatile memory to store information such as a serial number, power consumption needs of the SSD multiplexer and/or an attached SSD, and so on.

Multiplexer controller 310 may determine whether the first transport fabric 376 or the second transport fabric 378 is active, and may cause the multiplexer 372 to connect the logical port (or physical port) coupled to the active transport fabric to the first port 370 (and thus to SSD 350). In one embodiment, multiplexer controller 310 receives a message (e.g., a control signal) from a management module indicating which of the transport fabrics is active. The multiplexer controller 310 may then determine which logical port to switch to based on the received message.

Multiplexer controller 310 may communicate with a management module of a storage server using a 1-wire signal. Alternatively, multiplexer controller 310 may communicate with the management module using an inter-integrated circuit (I²C) signal or other protocol signal. 1-wire is a device communications bus system that provides low-speed data, signaling and power over a single signal. The 1-wire signal may be sent via as little as two wires (a data wire and a ground wire). In one embodiment, the 1-wire signal is sent over wires in the second port 374. In one embodiment, the signal indicating which transport fabric is active (and/or which transport fabric to switch to) is sent as a 1-wire signal.

Multiplexer controller 310 may store information such as a serial number, a component identifier, information identifying how much power the SSD multiplexer 352 and connected SSD 354 require, and/or additional information. When the FRU 300 is first plugged into a backplane, the management module may send a 1-wire interrogation signal to the SSD multiplexer 352 before power is provided to the SSD multiplexer 352 or SSD 354. Accordingly, the management module may communicate with the multiplexer controller 310 using the 1-wire signal even if the SSD multiplexer 352 is unpowered. To accomplish this, the multiplexer controller 310 may be minimally powered via the 1-wire signal. The supplied power may be enough to enable the multiplexer controller 310 to send a message to the management module. The message may be a response to the 1-wire interrogation signal, and may report stored information such as the serial number of the SSD multiplexer 352, information about the SSD 254, information identifying how much power the SSD multiplexer 352 and connected SSD 354 require, and/or additional information.

After the management module interrogates the SSD multiplexer 352, it may send a power on signal that causes the multiplexer controller 310 to power on the SSD multiplexer 352 and SSD 350. For example, if the information provided by the multiplexer controller 310 to the management module satisfies some criteria (e.g., if the provided serial number matches a stored serial number and/or the total power consumed by the storage server after powering on the SSD multiplexer 352 and SSD 350 does not exceed a power threshold), then the management module may send the power on signal to the multiplexer controller 310 using 1-wire. In one embodiment, 12 volt power is supplied to the SSD multiplexer 352 as soon as the SSD multiplexer 352 is plugged into the chassis of the storage server. However, that 12V may not be applied to the SSD multiplexer 352 (or to the SSD 354) until the power on signal is received from the management module. Multiplexer controller 310 may additionally include a clock for timing purposes.

In one embodiment, second port 374 includes one pin that is shorter than all of the other pins in the second port 374. The short pin acts as an early warning that the FRU 300 is about to be unplugged. When the short pin loses electrical contact to the backplane (e.g., the electrical connection to the short pin becomes open), multiplexer 310 may determine that the FRU 300 is about to be removed from the chassis (or is presently being removed from the chassis). Accordingly, when an open electrical connection is detected for the short pin, the multiplexer controller 310 may send a hot unplug warning to the management module. The hot unplug warning may be sent as a 1-wire signal or as an interrupt to the management controller. The management module may then quiesce an I/O controller, a host accessing the SSD 350, an application, the SSD 350, and/or any other components of the storage server (e.g., SSDs, the management module and/or I/O controllers). As used herein, the term to quiesce means to pause or alter a device, application, host or process to achieve a consistent state. Quiescing the I/O controller and/or hosts (or processes and/or applications on the hosts) may include terminating one or more pending reads or writes and sending a message to a host that the read or write was unsuccessful. Quiescing may involve, for example, terminating reads gracefully by sending a response (to an I/O controller and/or host) with an incomplete status code instead of returning requested data. Quiescing may additionally involve, for example, dropping writes without sending an acknowledgement to the requesting host. That host may then retry since it does not receive a positive completion acknowledgement. Thus, the host may remove any state that is associated with a function that causes the read or write, and may revert back to a state that the host had prior to starting the function.

In one embodiment, the SSD multiplexer 352 includes multiple light emitters (e.g., light emitting diodes (LEDs)). Multiplexer controller 310 may cause a first LED 390A to emit light when the SSD multiplexer 352 is powered on. A second LED 390B may indicate active reads or writes. For example, multiplexer controller 310 may cause the second LED 390B to blink when reads or writes are being performed on SSD 350. In one embodiment, drive carrier 305 includes holes that cause the LEDs 390A-B to be visible when the FRU 300 is plugged into a chassis of a storage server.

Figure 4:
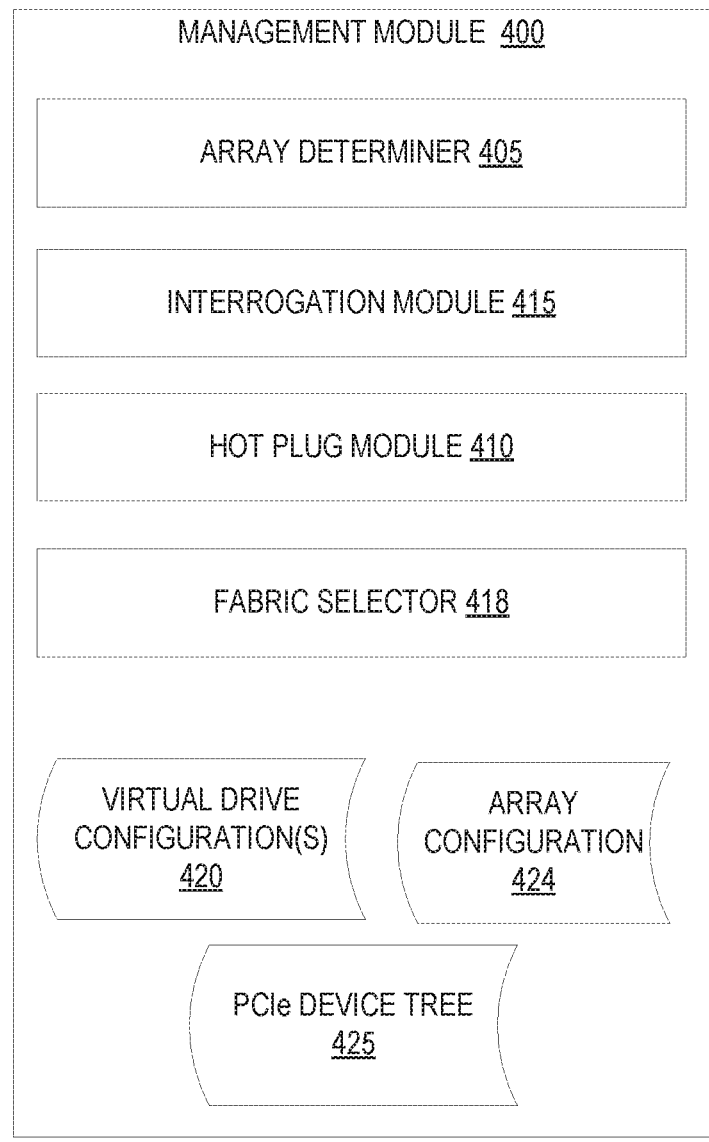
FIG. 4 is a block diagram of one embodiment of a management module for a storage server.

FIG. 4 is a block diagram of one embodiment of a management module 400 showing logical modules that may be loaded into and executed by a processing device of management module 400. Alternatively, management module 400 may include one or more physical modules (e.g., an integrated circuit (IC) designed with described modules or a configurable logic such as a field programmable gate array (FPGA) configured to have the modules). The modules, components and other features described herein can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Management module 400 may include a processing device representing one or more general-purpose processors such as a microprocessor, central processing unit, or the like. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. Management module 400 may additionally include a volatile and/or non-volatile memory and one or more ports. In one embodiment, management module 400 is a system on a chip (SoC) including a processing device, a memory, one or more NICs and one or more internal ports.

In one embodiment, management module 400 includes the modules of an array determiner 405, a hot plug module 410, an interrogation module 415 and a fabric selector 418. Alternatively, the functionality of the array determiner 405, hot plug module 410, fabric selector 418 and/or interrogation module 415 may be divided into additional modules or may be combined into a single module. In one embodiment, management module 400 corresponds to management module 115 of FIG. 1 and/or management module 215 of FIG. 2.

Array determiner 405 determines how available storage devices are to be configured into an array, and may store such information as array configuration 422. Array determiner 405 additionally determines how to divide the array of storage devices into virtual drives (e.g., into virtual NVMe drives), and this information may be included in virtual drive configuration(s) 420. Array determiner 405 may determine how many virtual drives to create, the sizes of those virtual drives, and what physical addresses of the storage devices to allocate to each virtual drive. Once the configurations for the virtual drives are determined, array determiner 405 sends the virtual drive configurations 420 to I/O controllers. The I/O controllers may then use the received virtual drive configurations 420 to establish and maintain the virtual drives.

In one embodiment, array determiner 405 generates a PCIe device tree 425 representing a maximal topology of a storage server when the storage server is powered up. PCIe device tree 425 represents a maximum number of storage controllers and SSDs that may be included in the storage server. The PCIe device tree 425 represents the maximal topology so that the device tree does not need to be rebuilt or rebalanced when storage controllers and/or SSDs are discovered. Each of the devices in the PCIe device tree are placeholders initially. When storage controllers or SSDs are discovered, the placeholders are replaced with information for real devices without otherwise changing the PCIe device tree 425.

Interrogation module 415 performs discovery operations to enable discovery of FRUs that are plugged into a storage server. When a FRU is detected, interrogation module sends an interrogation signal (e.g., a 1-wire interrogation signal or I²C interrogation signal) to the FRU. The SSD multiplexer of the FRU then responds with identifying information about the SSD multiplexer and/or the SSD attached to the SSD multiplexer. The response may be sent as a 1-wire response or I²C response. Interrogation module 415 determines whether to power on the FRU based on the response. If the FRU is to be powered on, interrogation module 415 sends a power on signal (which may be, for example, a 1-wire signal) to the SSD multiplexer of the FRU. Interrogation module 415 may additionally integrate the SSD into one or more existing virtual drives and/or create a new virtual drive incorporating the SSD. In one embodiment, interrogation module 415 replaces a placeholder in the PCIe device tree 425 with information for the SSD.

Fabric selector 418 is responsible for determining which of multiple transport fabrics on the storage server should be active. Once a fabric is selected, fabric selector 418 sends signals to each of the FRUs plugged into the storage server instructing them to connect to the active transport fabric. The signals may be, for example, 1-wire signals.

Hot plug module 410 is responsible for enabling SSDs (e.g., NVMe drives) to be plugged and unplugged from a storage server during operation (e.g., without powering down the storage server). Thus, SSDs may be removed from and inserted into the storage server at arbitrary times. Hot plug module 410 may detect a new FRU (including a new SSD multiplexer and a new SSD) when that FRU is inserted into the storage server. Interrogation module 415 may then determine if there is sufficient power to operate the FRU and other components of the storage server based on the aforementioned interrogation process. If there is sufficient power, hot plug module 410 instructs interrogation module 415 to activate the SSD (e.g., sends a signal to the FRU instructing it to power on) and replaces a placeholder in the PCIe device tree 425 with information for the new SSD.

Hot plug module 410 may additionally detect when an SSD is being unplugged from the storage server based on a hot unplug warning signal received from a FRU that has a short pin with an open connection. The warning signal may be, for example, a 1-wire signal or interrupt. Responsive to detecting the imminent removal of the SSD, hot plug module 410 may send messages to all I/O controllers and hosts that are using the SSD (e.g., that are using a virtual SSD that maps to the SSD) instructing those I/O controllers and hosts to quiesce. This enables the hosts and I/O controllers to reach a quiescent state and de-allocate any resources being consumed with reference to the SSD. Once all of the hosts using the SSD have relinquished use of the SSD, hot plug module 410 may send messages to the I/O controllers to disconnect from the SSD. Hot plug module 410 may then replace the SSD in the PCIe device tree 425 with a placeholder, and may turn off the SSD.

Figure 5A:
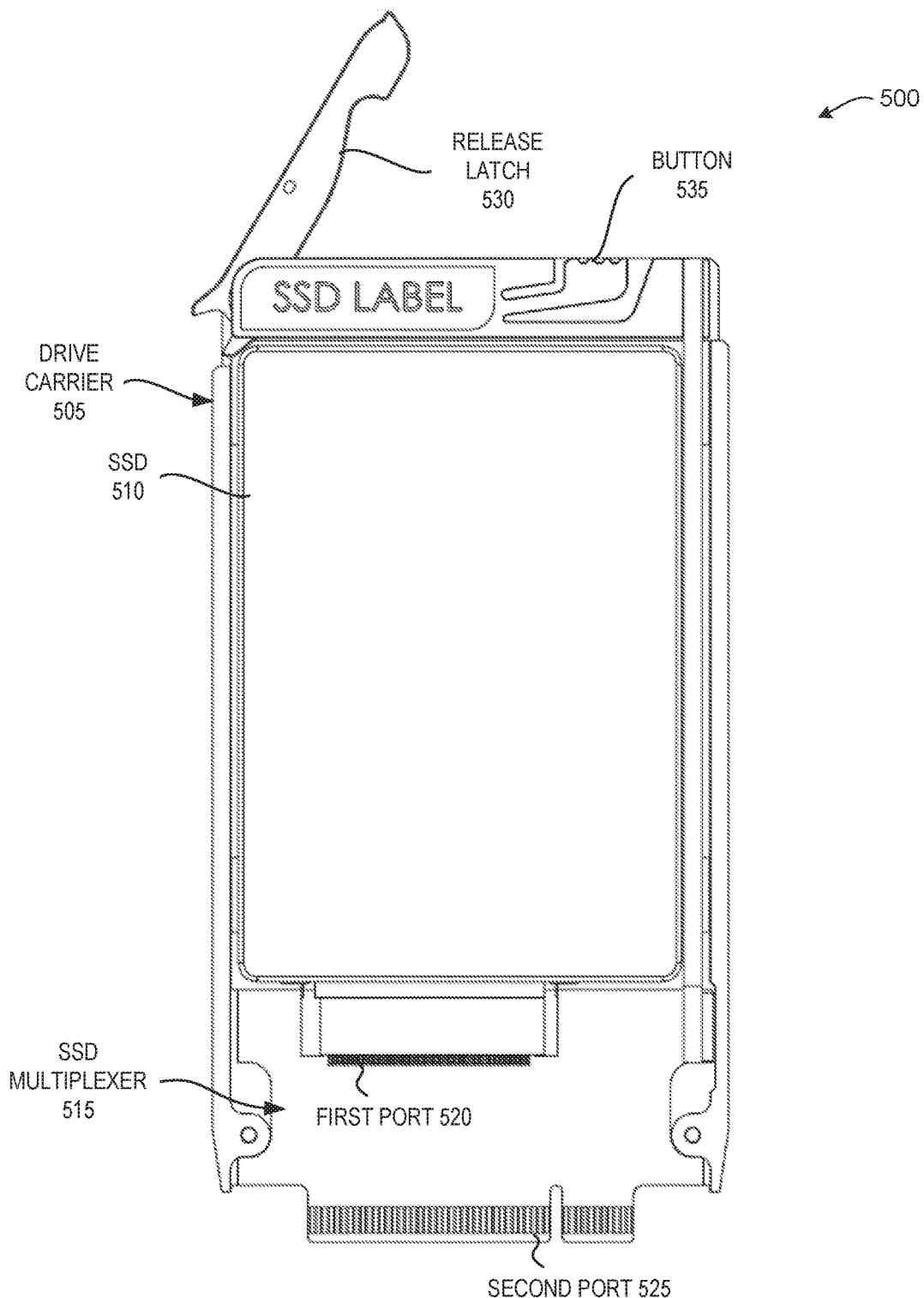
FIG. 5A depicts a front view of one embodiment of a field replaceable unit.
Figure 5B:
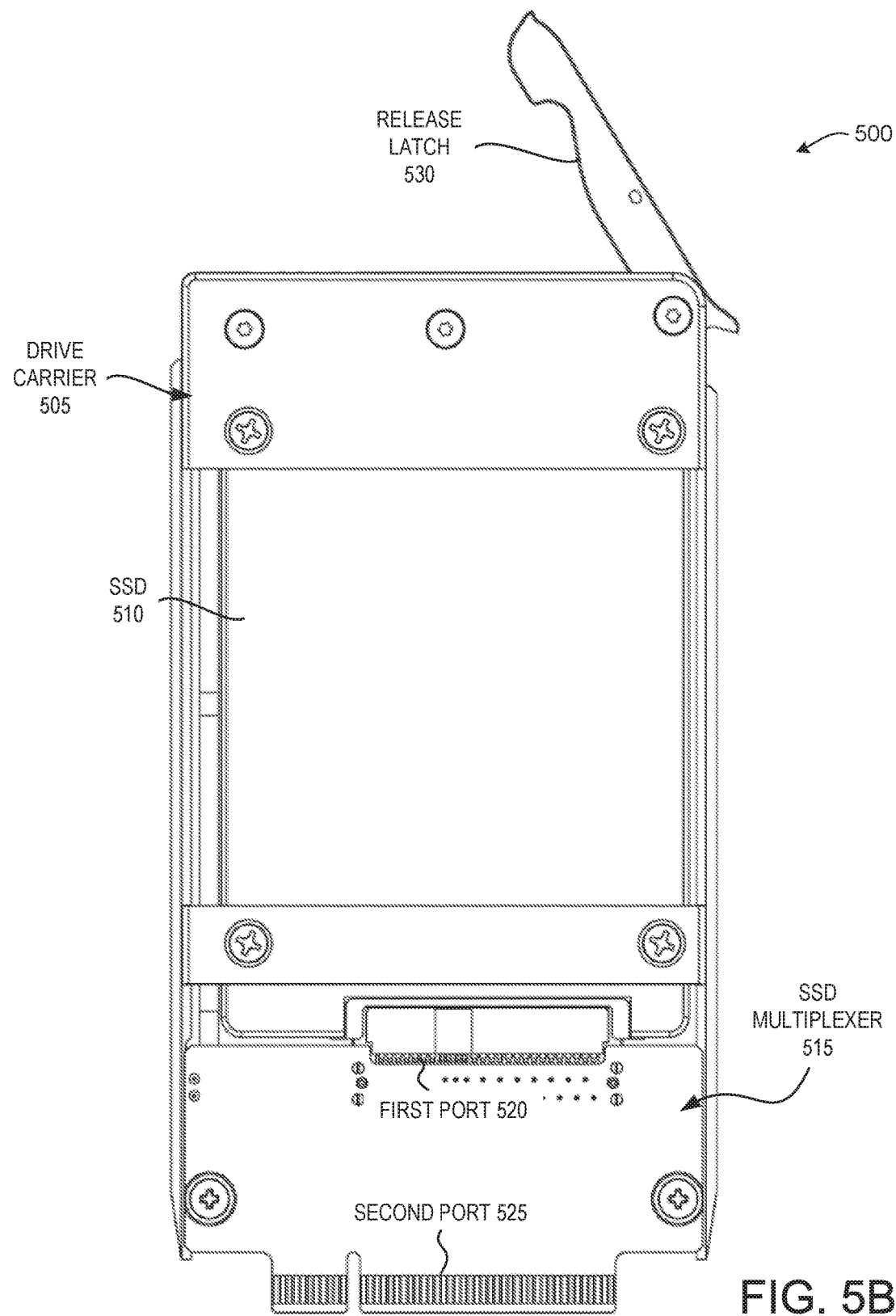
FIG. 5B depicts a back view of one embodiment of a field replacement unit of FIG. 5A.
Figure 5C:
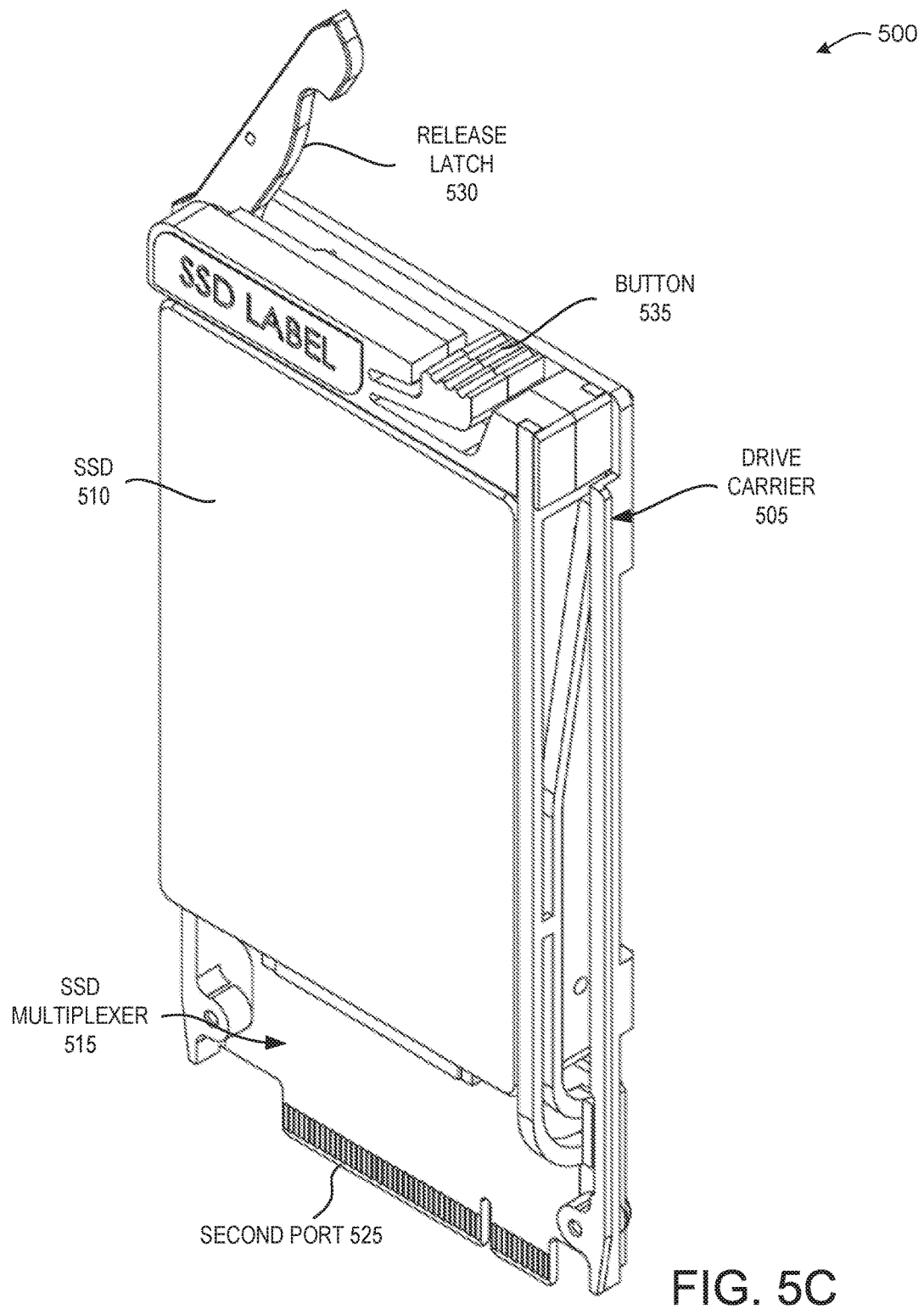
FIG. 5C depicts a front perspective view of the field replaceable unit of FIGS. 5A-B, in accordance with one embodiment.
Figure 5D:
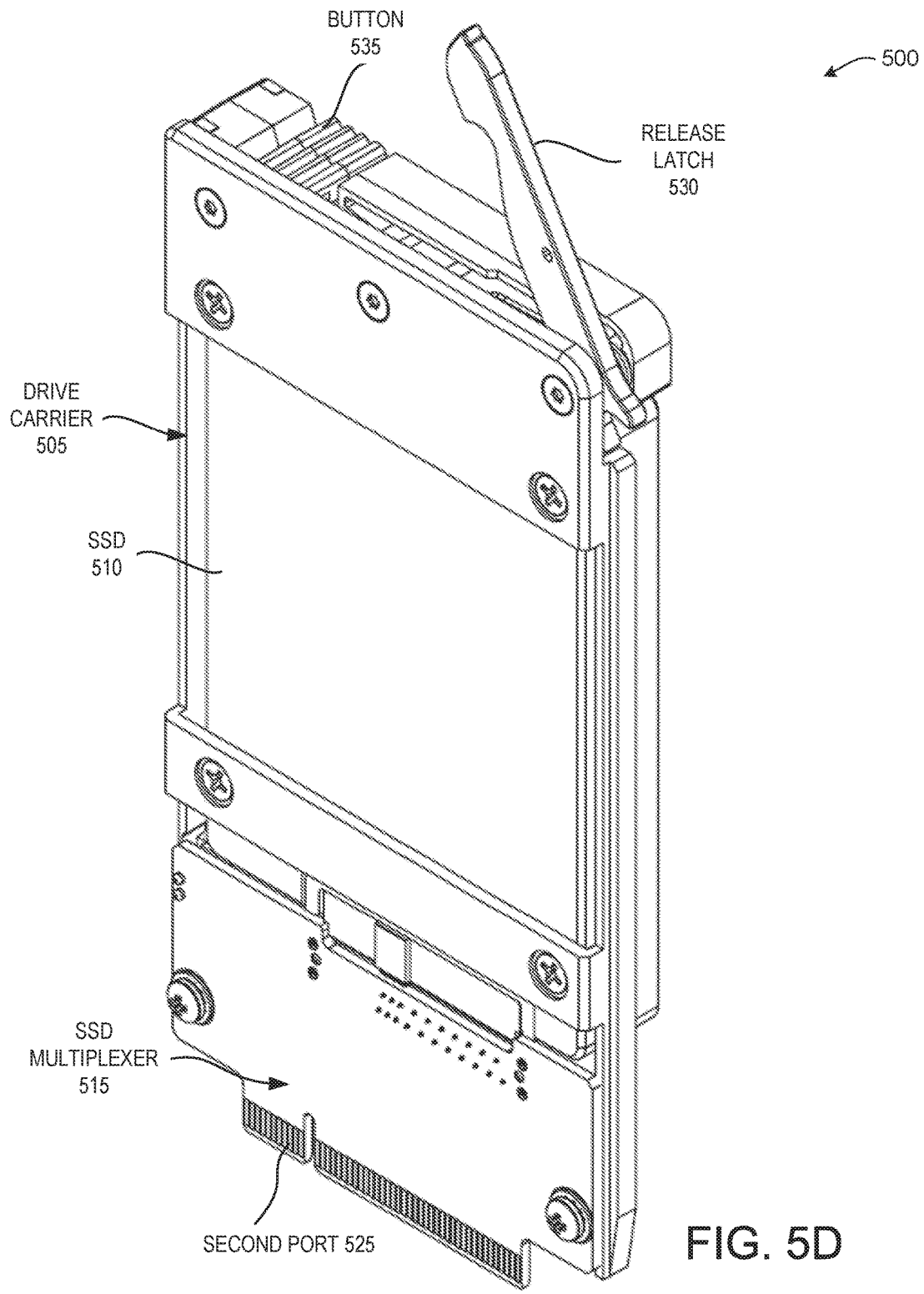
FIG. 5D depicts a back perspective view of the field replaceable unit of FIGS. 5A-C, in accordance with one embodiment.

FIG. 5A depicts a front view of one embodiment of a field replaceable unit (FRU) 500 that includes a drive carrier 505, an SSD 510 mounted to the drive carrier 505, and an SSD multiplexer 515 mounted to the drive carrier and coupled to the SSD 510. FIG. 5B depicts a back view of one embodiment of the field replacement unit 500. FIG. 5C depicts a front perspective view of the assembled field replaceable unit 500, in accordance with one embodiment. FIG. 5D depicts a back perspective view of the field replaceable unit 500, in accordance with one embodiment.

The SSD multiplexer 515 includes a first port 520 that couples to the SSD 510 and a second port 525 that is to couple to a transport fabric of a storage server. Drive carrier 505 may be a frame made of metal and/or other materials that is used to couple SSD 510 to SSD multiplexer 515. This enables the SSD 510 and SSD multiplexer 515 to be a single FRU 500.

Figure 6A:
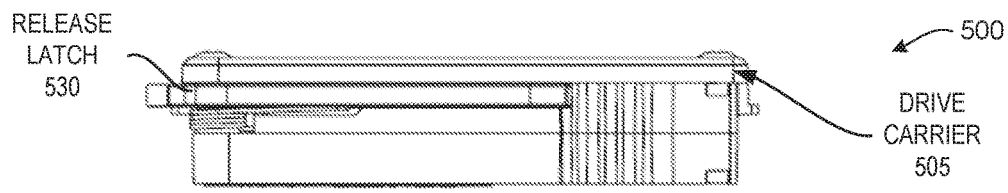
FIG. 6A depicts top view of the field replaceable unit of FIGS. 5A-D, in accordance with one embodiment.
Figure 6B:
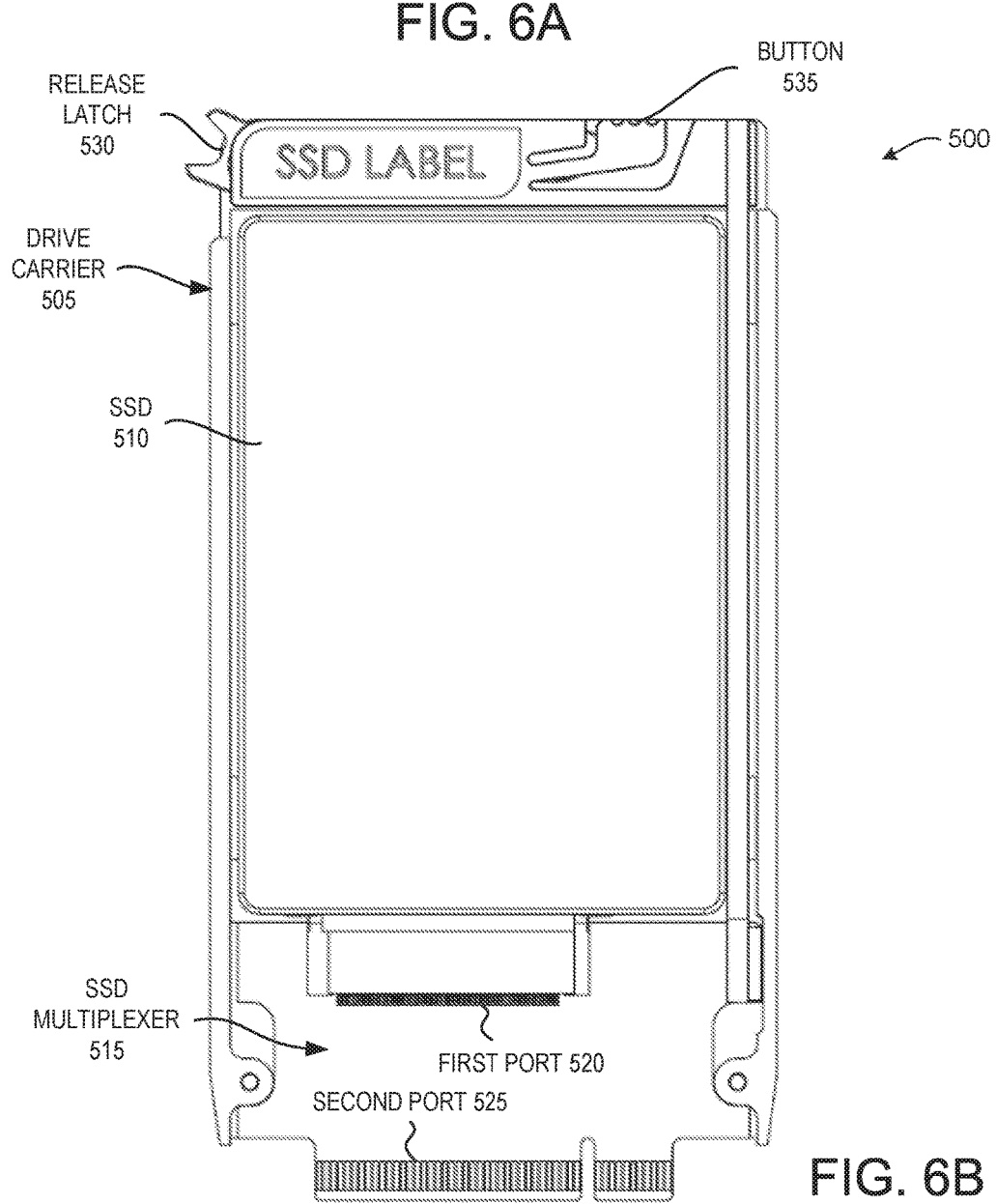
FIG. 6B illustrates a second back view of the field replaceable unit of FIGS. 5A-6A, in accordance with one embodiment.

As shown, the drive carrier 505 includes a release latch 530 that enables the drive carrier 505 to be easily inserted into and removed from a storage server chassis. When the drive carrier is inserted into a storage server chassis, pressing on the release latch 530 will cause the release latch 550 to engage a feature on the storage server chassis that secures the FRU 500 to the storage server chassis. The drive carrier 505 additionally includes a button 535 that can be pressed to release the release latch 530 and enable the FRU 500 to be easily removed from the storage server chassis. In FIGS. 5A-5D, the release latch 530 is released. FIG. 6A illustrates a top view of the FRU 500. FIG. 6B illustrates a second back view of the FRU 500. In FIGS. 6A and 6B, the release latch 530 is engaged.

Figure 7:
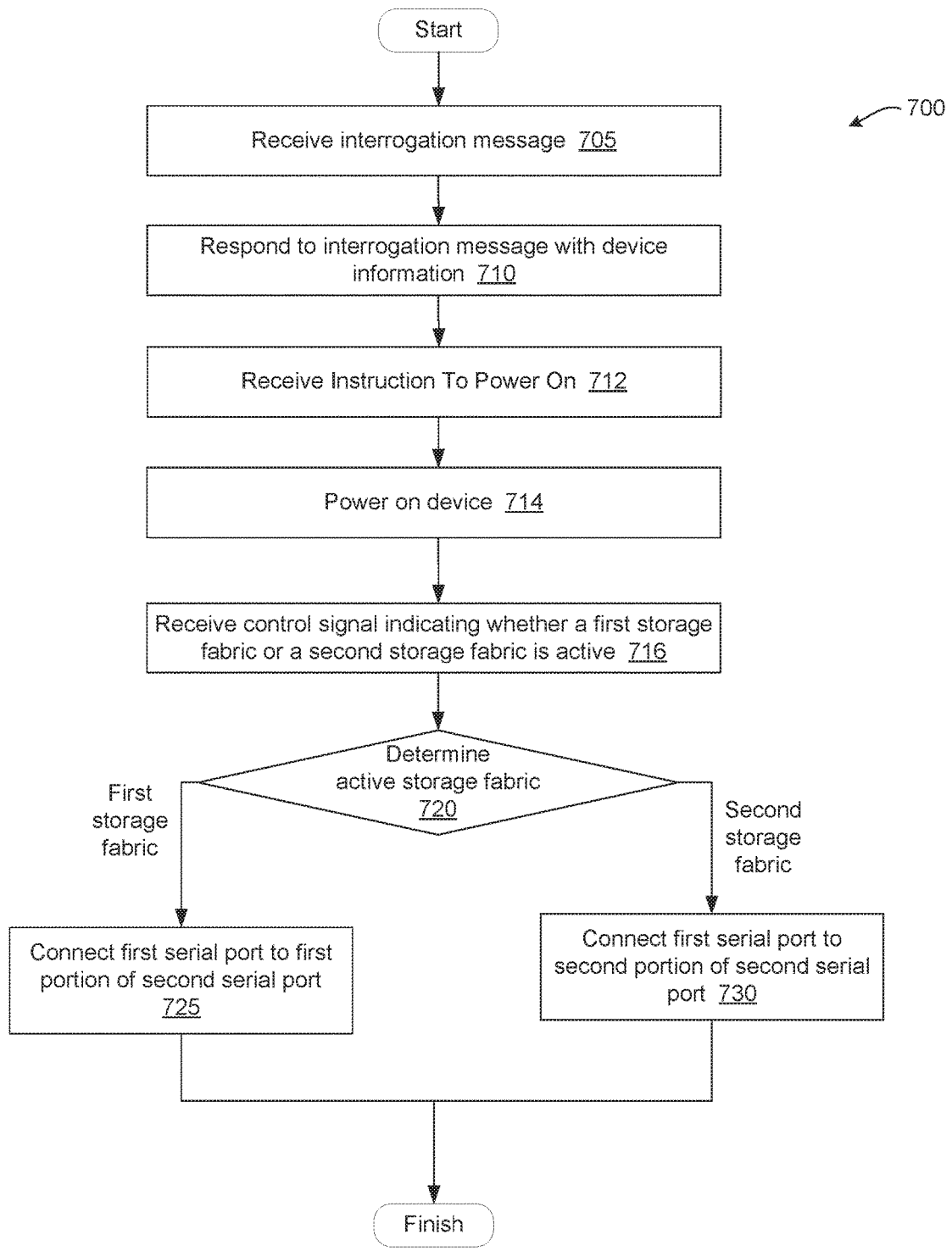
Figure 8:
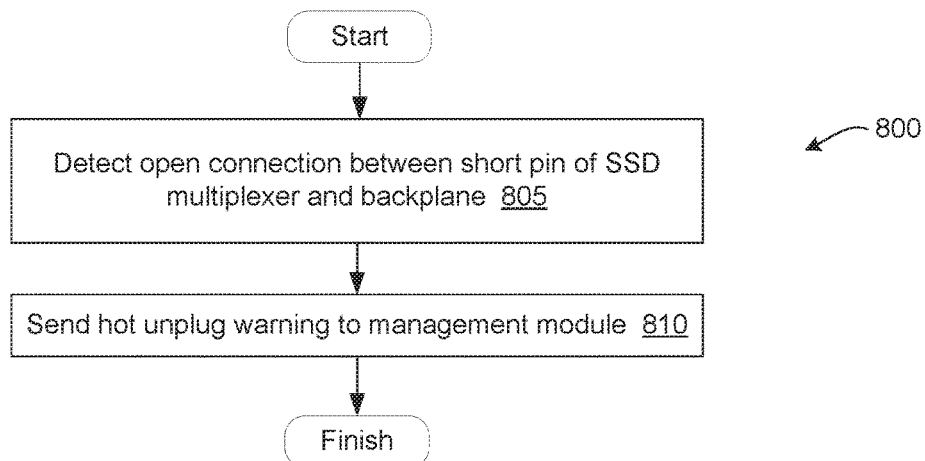
FIG. 8 is a flow diagram of one embodiment for a method of detecting a hot unplug event for a solid state drive.
Figure 9:
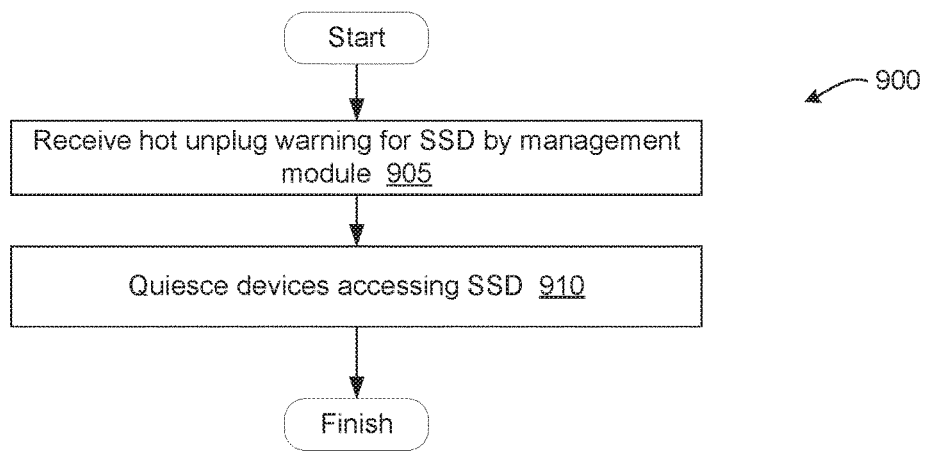
FIG. 9 is a flow diagram of one embodiment for a method of quiescing I/O controllers and/or hosts accessing a solid state drive to provide hot unplug functionality.

FIGS. 7-9 are flow diagrams of various implementations of methods related to providing redundant full bandwidth paths to an SSD. The methods are performed by processing logic that may include hardware (circuitry, dedicated logic, etc.), software (such as is run on a general purpose computer system or a dedicated machine), or a combination of both. Some methods may be performed by an SSD multiplexer such as SSD multiplexer 352 of FIG. 3. Some methods may be performed by a management module such as management module 400 of FIG. 4.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 7 is a flow diagram of one embodiment for a method 700 of selecting a transport fabric to connect a solid state drive to. Method 700 may be performed by processing logic of a solid state drive multiplexer. At block 705 of method 700, the SSD multiplexer receives an interrogation message. The interrogation message may be a 1-wire signal or other type of signal. At block 710, the SSD multiplexer responds to the interrogation message with device information including a serial number and an amount of power needed to power the SSD multiplexer and an SSD coupled to the SSD multiplexer. At block 712, the SSD multiplexer receives an instruction (e.g., a 1-wire signal) to power on. At block 714, the SSD multiplexer powers itself and an attached SSD on.

At block 716, the SSD multiplexer receives a control signal indicating whether a first transport fabric or a second transport fabric is active. The control signal may be a 1-wire signal in one embodiment. At block 720, the SSD multiplexer determines whether to connect the SSD to the first transport fabric or to the second transport fabric based on the received control signal. Alternatively, the SSD multiplexer may include logic to automatically detect which of the fabrics is active, and may connect the SSD to the determined active fabric without first receiving a control signal indicating the active transport fabric. If the first transport fabric is active, the method continues to block 725 at which the SSD multiplexer connects a first serial port that couples to the SSD to a first portion of a second serial port, wherein the first portion of the second serial port constitutes a first logical port that connects to the first transport fabric. If the second transport fabric is active, the method continues to block 730 at which the SSD multiplexer connects the first serial port that couples to the SSD to a second portion of the second serial port, wherein the second portion of the second serial port constitutes a second logical port that connects to the second transport fabric. Alternatively, at block 725 the SSD multiplexer may connect the first serial port to a second physical serial port that couples to the first transport fabric and at block 730 the SSD multiplexer may connect the first serial port to a third physical serial port that couples to the second transport fabric.

FIG. 8 is a flow diagram of one embodiment for a method 800 of detecting a hot unplug event for a solid state drive. Method 800 may be performed by an SSD multiplexer. At block 805 of method 800, the SSD multiplexer detects an open connection between a short pin of the SSD multiplexer and a backplane (e.g., a PCIe slot in a backplane PCB). At block 810, the SSD multiplexer sends a hot unplug warning to a management module. The hot unplug warning may be sent as a 1-wire signal or interrupt.

FIG. 9 is a flow diagram of one embodiment for a method 900 of quiescing a devices accessing an SSD to provide hot unplug functionality. Method 900 may be performed by processing logic (e.g., a processing device) of a management module for a storage server in embodiments. At block 905 of method 900, the management module receives a hot unplug warning from an SSD multiplexer coupled to an SSD. At block 910, the management module determines I/O controllers that are accessing the SSD and sends signals to those I/O controllers to quiesce the I/O controllers. Additionally, the management module determines one or more hosts that are accessing the SSD and sends signals to the one or more hosts to quiesce those hosts. Operations performed to quiesce an I/O controller and/or host are discussed above with reference to FIG. 4. By detecting an unplug event and quiescing the I/O controllers and/or hosts prior to disconnection of an SSD, management module is able to provide hot unplug capabilities to SSDs, which traditionally are not able to support hot plug and hot unplug. Thus, the SSD multiplexer described in embodiments may provide a storage server with a capability to hot plug and hot unplug an SSD.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "responding", "determining", "receiving", "sending", "quiescing" or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing at least some of the operations described herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "non-transitory computer-readable storage medium" shall be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
a first serial port having a first number of lanes usable to form a first multi-lane link to a solid state drive (SSD);
a second serial port having a second number of lanes that is at least twice the first number of lanes, wherein a first subset of the second number of lanes constitutes a first logical serial port and is usable to form a second multi-lane link to a first transport fabric and a second subset of the second number of lanes constitutes a second logical serial port and is usable to form a third multi-lane link to a second transport fabric;
a multiplexer, coupled to the first serial port and the second serial port, to connect the first serial port to one of the first logical serial port or the second logical serial port; and
a controller, coupled to the multiplexer, to:
determine whether to connect the first serial port to the first logical serial port or the second logical serial port; and
receive an interrogation signal while the apparatus is unpowered, wherein the interrogation signal supplies a minimal power that is sufficient to enable the controller to send a response to the interrogation signal but that is insufficient to power the apparatus.

2. The apparatus of claim 1, wherein the controller is further to:
determine whether the first transport fabric or the second transport fabric is active;
cause the multiplexer to connect the first serial port to the first logical serial port responsive to a determination that the first transport fabric is active; and
cause the multiplexer to connect the first serial port to the second logical serial port responsive to a determination that the second transport fabric is active.

3. The apparatus of claim 2, wherein the controller is to:
send a response to the interrogation signal, the response comprising at least one of a serial number of the apparatus or information about the SSD attached to the first serial port of the apparatus; and
receive a control signal indicating whether the first transport fabric or the second transport fabric is active.

4. The apparatus of claim 1, wherein the apparatus provides a first path to the SSD via the first logical serial port and a second path to the SSD via the second logical serial port, wherein the first path and the second path each use the first number of lanes to provide a maximum input/output capacity to the SSD.

5. The apparatus of claim 1, wherein the first number of lanes comprises four to eight lanes each having an input/output capacity of 8-32 Gigabits per second.

6. The apparatus of claim 1, wherein the first serial port comprises a SSD form factor (SFF) port and the second serial port comprises a peripheral component interconnect express (PCIe) port.

7. The apparatus of claim 1, wherein the apparatus comprises a card, wherein the first serial port comprises a female connector and the second serial port comprises a male connector.

8. The apparatus of claim 1, wherein the second serial port comprises a plurality of pins, wherein one of the plurality of pins is a short pin that is shorter than a remainder of the plurality of pins, and wherein the controller is further to:
detect that an electrical connection to the short pin has become open; and
send a message to a management module of a storage server indicating that the electrical connection to the short pin has become open, wherein the message causes the storage server to a) terminate at least one of a pending read operation or a pending write operation directed to the SSD and b) notify a host accessing the SSD that at least one of the pending read operation or the pending write operation was unsuccessful.

9. The apparatus of claim 1, wherein the apparatus provides a storage system with a capability to hot unplug the SSD, and wherein the interrogation signal comprises a 1-wire signal.

10. The apparatus of claim 1, further comprising:
a drive carrier to hold the SSD and the apparatus, wherein the drive carrier has a length that accommodates the SSD and the apparatus connected to one end of the SSD, and wherein the drive carrier, the SSD and the apparatus together form a single field replaceable unit (FRU).

11. An apparatus comprising:
a printed circuit board (PCB);
a first serial port, connected to the PCB, having a first number of lanes usable to form a first multi-lane link to a solid state drive (SSD);
a second serial port, connected to the PCB, having a second number of lanes usable to form a second multi-lane link to at least one of a first transport fabric or a second transport fabric, wherein the second serial port comprises a plurality of pins, wherein one of the plurality of pins is a short pin that is shorter than a remainder of the plurality of pins; and
a controller, connected to the PCB, to:
receive an interrogation signal while the apparatus is unpowered, wherein the interrogation signal supplies a minimal power that is sufficient to enable the controller to send a response to the interrogation signal but that is insufficient to power the apparatus;

after the apparatus has become powered, detect that an electrical connection to the short pin has become open; and send a message to a management module of a storage server indicating that the electrical connection to the short pin has become open.

12. The apparatus of claim 11, wherein the second number of lanes is at least twice the first number of lanes, wherein a first subset of the second number of lanes constitutes a first logical serial port and is usable to form the second multi-lane link to the first transport fabric and a second subset of the second number of lanes constitutes a second logical serial port and is usable to form a third multi-lane link to the second transport fabric.

13. The apparatus of claim 12, further comprising:

a multiplexer, coupled to the first serial port and the second serial port, to connect the first serial port to one of the first logical serial port or the second logical serial port, wherein the controller is further to determine whether to connect the first serial port to the first logical serial port or the second logical serial port.

14. The apparatus of claim 13, wherein the controller is further to:

determine whether the first transport fabric or the second transport fabric is active;

cause the multiplexer to connect the first serial port to the first logical serial port responsive to a determination that the first transport fabric is active; and cause the multiplexer to connect the first serial port to the second logical serial port responsive to a determination that the second transport fabric is active.

15. The apparatus of claim 12, wherein the apparatus provides a first path to the SSD via the first logical serial port and a second path to the SSD via the second logical serial port, wherein the first path and the second path each use the first number of lanes to provide a maximum input/output capacity to the SSD.

16. The apparatus of claim 11, wherein the first number of lanes is equal to the second number of lanes.

17. The apparatus of claim 11, wherein the apparatus provides a storage system with a capability to hot unplug the SSD, and wherein the controller is further to send a response to the interrogation signal, the response comprising at least one of a serial number of the apparatus or information about the SSD attached to the first serial port of the apparatus.

18. A method comprising:

receiving, by a controller of an apparatus coupled to a solid state drive (SSD), an interrogation signal while the apparatus is unpowered, wherein the interrogation signal supplies a minimal power that is sufficient to enable the controller to send a response to the interrogation signal but that is insufficient to power the apparatus;

sending, by the controller, a response to the interrogation signal;

receiving, by the controller, a control signal indicating whether a first transport fabric or a second transport fabric is active;

determining, by the controller and based on the control signal, that the first transport fabric is active; and connecting, by a multiplexer of the apparatus, a first serial port that couples the apparatus to the SSD to a first portion of a second serial port that couples the apparatus to the first transport fabric, wherein the first serial port has a first number of lanes usable to form a first multi-lane link to the SSD, the second serial port has a second number of lanes that is at least twice the first number of lanes, and the first portion of the second serial port comprises the first number of lanes.

19. The method of claim 18, further comprising:

receiving a new control signal indicating that the second transport fabric is active; and disconnecting the first serial port from the first portion of the second serial port; and connecting the first serial port to a second portion of the second serial port that couples the apparatus to the second transport fabric, wherein the second portion of the second serial port comprises the first number of lanes.

20. The method of claim 18, wherein the second serial port comprises a plurality of pins, wherein one of the plurality of pins is a short pin that is shorter than a remainder of the plurality of pins, the method further comprising:

detecting that an electrical connection to the short pin has become open; and sending a message to a storage server indicating that the electrical connection to the short pin has become open, wherein the message causes the storage server to quiesce at least one of an input/output controller or a host accessing the SSD.

* * * * *